Jan. 9, 1962     H. BOOMKENS     3,016,228

LOADING WINCH WITH TWO DRUMS, ESPECIALLY FOR SHIPS

Filed Nov. 12, 1958

INVENTOR

*Hans Boomkens*

By *Lowry & Rinehart*

ATTYS.

3,016,228
LOADING WINCH WITH TWO DRUMS, ESPECIALLY FOR SHIPS
Hans Boomkens, Hamburg, Germany, assignor to Eduard Winter Motoren- und Apparatebau, Hamburg-Schnelsen, Germany, a firm
Filed Nov. 12, 1958, Ser. No. 773,479
2 Claims. (Cl. 254—185)

This invention relates to loading winches, and more specifically to a loading winch with two drums, especially for ships.

For loading and unloading ships, winches with two drums are generally used, which drums are freely rotatable on a driven shaft. By means of a clutch either drum as required can be coupled to the shaft. Each drum is provided with a brake in known manner.

The object of the invention is to provide a loading winch of the kind referred to, which is simple and safe in operation.

According to the invention, a loading winch, especially for ships, comprises a rotatable shaft, means for driving said shaft, two separate drums freely rotatable on said shaft, at least one clutch part mounted on the shaft for rotation therewith and longitudinal displacement thereon to couple either drum selectively to the shaft, brakes, one coordinated to each drum, at least one pivoted clutch lever adapted to effect said longitudinal displacement of said clutch part to couple one of said drums to said shaft, a hydraulic control device for actuating said clutch lever and the brake of the other of said drums.

In one form of loading winch, the hydraulic control device comprises a double-acting pressure medium cylinder, a piston slidable within said cylinder, a piston rod connecting said piston to said clutch lever, and at least one spring interposed between said piston rod and said clutch lever. Other similar means can replace the springs; the actuating means consists, for example, of diaphragms, pistons or a hydraulic motor. The arms of the clutch lever conveniently act via the springs on elbow levers, wedges or cams of brake bands or brake shoes.

In the bilateral path of swing of the clutch lever it is also possible for hydraulic receivers, such as diaphragms or pistons, to be arranged for actuating the clutch and hydraulic transmitters, such as diaphragms or pistons, to be arranged for actuating the brakes. The transmitters and receivers are connected to the clutch lever via springs. The receivers for actuating the clutch are operated directly by the actuating means for the hydraulic control device via hydraulic conduits. The transmitters actuate the brakes directly via hydraulic conduits to release the brake of the drum which at a given time is connected to the shaft.

It is preferable to interpose an auxiliary diaphragm in the hydraulic conduits of each brake device, on which diaphragm there acts a brake pedal which can be operated as desired.

The loading winch can also be used for winding anchors, in which case the winding drums are toothed in the form of sprocket wheels.

Three preferred embodiments of the invention are illustrated by way of example in the accompanying drawing, in which.

Figure 1:
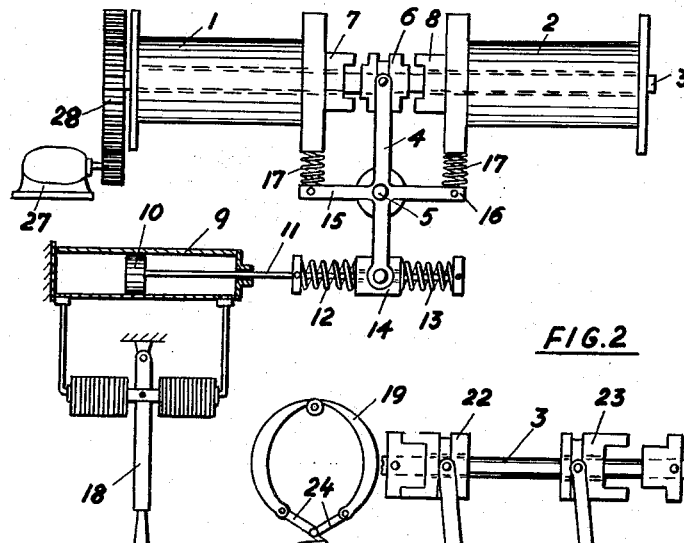
FIG. 1 is a diagrammatic view of a loading winch according to the invention, including a hydraulic control device for operating a clutch lever and a pair of brakes.

In the embodiment shown in FIG. 1, a loading winch includes drums 1 and 2 which are arranged to be freely rotatable on a shaft 3. The shaft 3 is driven in known manner by a motor 27 through the intermediary of gearing 28. By means of a clutch lever 4, which is pivotable about a pivot 5, a clutch part 6 which is mounted on the shaft 3 to rotate therewith can be connected as desired to either one of clutch parts 7 or 8 by longitudinal displacement of the clutch part 6 on the shaft 3.

The clutch lever 4 is actuated by a pressure medium cylinder 9 via a piston 10 and a piston rod 11 which latter projects through and is slidable in a head 14 hingedly mounted on the clutch lever 4. The head 14 is held in position on the piston rod 11 by springs 12 and 13, so that there is a certain elasticity on engagement of the clutch, especially when dog couplings are used.

The clutch lever 4 is formed with arms 15 and 16, which act via springs 17 on brake shoes 19 associated with the drums. The arrangement is such that in operative position the brake of the coupled drum is released and the brake of the uncoupled drum is tightened.

The pressure medium cylinder 9 is operated through the intermediary of a conventional actuating means 18.

Figure 2:
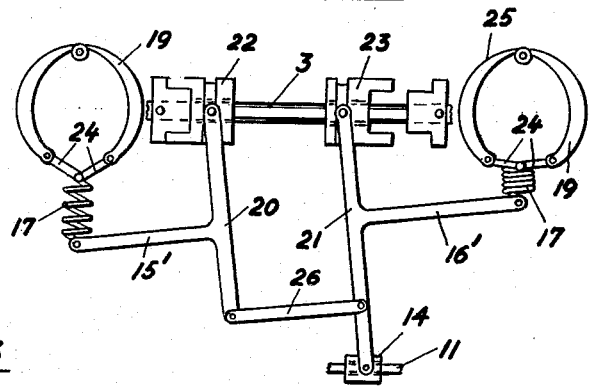
FIG. 2 is a diagrammatic view of a modified arrangement with two clutch levers and in which the brakes are represented as turned through 90°.

FIG. 2 shows an arrangement using two parallel clutch levers 20 and 21. Two clutch levers are used when the motor 27 and the gearing 28 of the winch shaft 3 are disposed between the drums. In this case the clutch part 6 shown in FIG. 1 is divided into clutch parts 22 and 23, one for each drum. The clutch levers 20 and 21 have arms $15^1$ and $16^1$, respectively, which act via springs 17 on elbow levers 24 of brake shoes 19, which are shown turned through 90°.

In the representation shown, the left-hand winch drum is coupled to the shaft 3 and the left-hand brake released, whereas the right-hand winch drum is uncoupled and its associated brake shoes 19 exert a braking action by means of their outer sides 25. The clutch levers 20 and 21 are connected by a link 26, by means of which both the clutch levers can be actuated equally.

Figure 3:
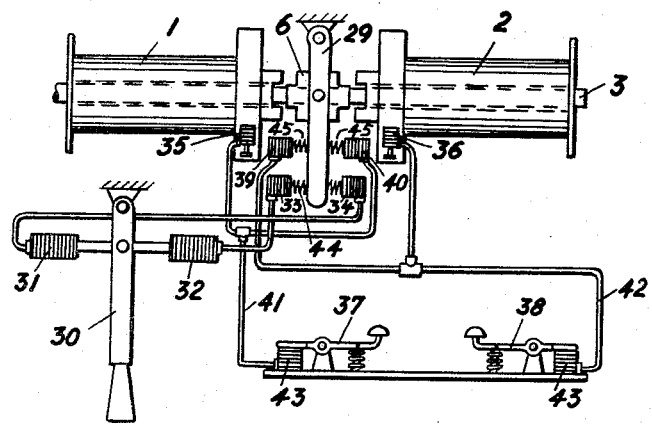
FIG. 3 is a diagrammatic view showing another embodiment with a different type of hydraulic control device.

FIG. 3 shows a remote control arrangement for coupling the drums 1 and 2 to the driving shaft 3. The clutch part 6 is shifted by a clutch lever 29 pivoted at one end to a stationary part of the apparatus. An actuating lever 30 acts on transmitter diaphragms 31 and 32, which forward hydraulic impulses to receiver diaphragms 33 and 34 associated with the other, free end of the clutch lever 29. When, for example, the transmitter diaphragm 32 is stressed, this will actuate the receiver diaphragm 33 and the clutch lever 29, causing the drum 2 to be coupled to the driving shaft 3.

The drums 1 and 2 are provided respectively with hydraulic braking devices 35 and 36 which can be hydraulically operated by foot pedals 37 and 38.

So that the drum coupled at a given time to the shaft 3 shall have its brake released and the uncoupled drum be braked, further transmitter diaphragms 39 and 40 are associated with the clutch lever 29. The diaphragms 39 and 40 are connected respectively via conduits 41 and 42 to auxiliary diaphragms 43 of the foot pedals 37 and 38. The braked drum can, as desired, be released by operating the corresponding foot pedal.

The receiver diaphragms 33 and 34 are connected to the pivotable clutch lever 29 via springs 44, and the transmitter diaphragms 39 and 40 are connected to the movable clutch lever 29 via springs 45 so that during engagement of the clutch the respective spring is tensioned before the clutch has actually engaged. When the clutch part 6 has moved to the proper position, it is snapped into engagement with the complementary clutch part of the selected drum and held in position by the tension of the spring.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A loading winch comprising a rotatable shaft, means for driving said shaft, two separate drums freely rotatable on said shaft, a clutch member rigidly secured to each of said drums, at least one movable clutch part mounted on the shaft for rotation therewith between the drums and longitudinally displaceable thereon to couple either drum selectively to the shaft, at least one pivoted clutch lever adapted to effect said longitudinal displacement of said movable clutch part on said shaft to couple one of said drums to said shaft, a hydraulic control device for actuating said clutch lever, springs provided between the hydraulic control device and the clutch lever, a braking device associated with each drum and arranged automatically to release the drum coupled with the shaft and brake the drum not coupled with the shaft, springs provided between the braking device and the clutch lever, said clutch lever being arranged alternately to actuate said braking device of said drums, hydraulic receivers for actuating the clutch lever and first hydraulic transmitters for actuating the braking devices arranged in the swing paths of said clutch lever at either side thereof, the hydraulic control device comprising second transmitters and a control lever for actuating said second transmitters, first conduits connecting said second transmitters with said receivers, second conduits connecting the first hydraulic transmitters with the braking devices, the receivers being arranged to be directly actuated by the second transmitters through the control lever and the first conduits, whereas the brakes are arranged to be actuated directly by the first transmitters through the second conduits to effect a disengagement of each respective drum being coupled.

2. A loading winch as claimed in claim 1, wherein an auxiliary diaphragm is arranged in the second hydraulic conduits of each braking device, and a brake pedal for each of said auxiliary diaphragms.

References Cited in the file of this patent

UNITED STATES PATENTS

| | | |
|---|---|---|
| 1,549,447 | Castleman | Aug. 11, 1925 |
| 1,590,790 | Wilson | June 29, 1926 |
| 2,279,597 | Selmer | Apr. 14, 1942 |